United States Patent
Huber

(10) Patent No.: US 10,136,491 B2
(45) Date of Patent: Nov. 20, 2018

(54) LIGHTING APPARATUS WITH ADJUSTABLE IRRADIANCE

(71) Applicant: B&R INDUSTRIAL AUTOMATION GMBH, Eggelsberg (AT)

(72) Inventor: Matthias Huber, Pleiskirchen (DE)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/591,675

(22) Filed: May 10, 2017

(65) Prior Publication Data
US 2017/0332454 A1  Nov. 16, 2017

(30) Foreign Application Priority Data

May 11, 2016 (AT) ................ A50435/2016

(51) Int. Cl.
| | | |
|---|---|---|
| *H05B 37/02* | (2006.01) | |
| *H05B 33/08* | (2006.01) | |
| *G06T 7/00* | (2017.01) | |

(52) U.S. Cl.
CPC ..... *H05B 33/0851* (2013.01); *H05B 33/0854* (2013.01); *H05B 37/02* (2013.01); *G06T 7/0004* (2013.01); *G06T 2207/10152* (2013.01)

(58) Field of Classification Search
CPC ............ H05B 37/0272; H05B 37/0218; H05B 41/3922; H05B 41/325; H05B 41/32;
(Continued)

(56) References Cited

U.S. PATENT DOCUMENTS

| | | |
|---|---|---|
| 4,958,354 A | 9/1990 | Urakami |
| 6,303,916 B1 | 10/2001 | Gladniclk |

(Continued)

FOREIGN PATENT DOCUMENTS

| | | |
|---|---|---|
| DE | 1 755 074 | 9/1970 |
| DE | 28 33 635 | 2/1980 |

(Continued)

OTHER PUBLICATIONS

European Search Report conducted in European Appln. No. EP 17 17 0137 (dated Sep. 29, 2017).
(Continued)

*Primary Examiner* — Minh D A
(74) *Attorney, Agent, or Firm* — Greenblum & Bernstein, P.L.C.

(57) ABSTRACT

To indicate a lighting means for a machine vision application where the resulting irradiance (P') in an illuminated area (5) at a working distance (d) can be precisely adjusted, an optical covering (2) of the lighting means (1) is provided, which is configured such that a transmitted part (t2) of the incident light (L) passes through (1) the optical covering (2), and a reflected component (r2) of the incident light (L) is reflected in the optical covering (2), wherein a light sensor (3) is provided that detects the intensity (Ir2) of the reflected component (r2) in the optical covering (2). Furthermore, a method is indicated, according to which the intensity (Ir2) of the reflected component (r2) is detected and the radiant power (P) of the light source (1) is regulated on the basis of the intensity (Ir2) in order to adjust the irradiance (P') of the transmitted component (t2).

21 Claims, 2 Drawing Sheets

(58) Field of Classification Search
CPC  H05B 39/042; H05B 37/0227; H05B 39/081; Y02B 20/46; Y02B 20/14; F21V 23/0442; H01T 2/00; H01T 1/00; H01T 2/02; H01J 17/00; H01J 2893/0059; G03B 15/05; H01H 47/24
See application file for complete search history.

(56) References Cited

U.S. PATENT DOCUMENTS

| | | |
|---|---|---|
| 2010/0066253 A1 | 3/2010 | Hying |
| 2011/0150028 A1 | 6/2011 | Nguyen et al. |
| 2015/0146751 A1* | 5/2015 | Downing ........... H05B 37/0227 |

FOREIGN PATENT DOCUMENTS

| | | |
|---|---|---|
| EP | 0 122 609 | 10/1984 |
| EP | 2 336 741 | 6/2011 |
| WO | 2009/050966 | 4/2009 |
| WO | 2015/097476 | 7/2015 |

OTHER PUBLICATIONS

Austria Search Report conducted in Austria Appln. No. A 50435/2016 (Nov. 18, 2016).

* cited by examiner

LIGHTING APPARATUS WITH ADJUSTABLE IRRADIANCE

CROSS-REFERENCE TO RELATED APPLICATIONS

The present application claims priority under 35 U.S.C. § 119(a) of Austrian Patent Application No. A50435/2016 filed May 11, 2016, the disclosure of which is expressly incorporated by reference herein in its entirety.

BACKGROUND OF THE INVENTION

1. Field of the Invention

The present invention relates to a lighting apparatus and to a method for providing illumination in a machine vision application, having a light source that emits light with a radiant power, and to the use of said lighting apparatus.

2. Discussion of Background Information

In industrial illumination, especially in so-called machine vision applications, LEDs are gradually becoming the state of the art and are meanwhile replacing other types of lighting apparatus, including with respect to radiant power. As is known, machine vision refers to methods for controlling and/or regulating technical processes, such as machines or systems, wherein the information required to control or regulate is obtained at least in part on the basis of the automated image processing of an image taken with a camera. A machine vision system thus comprises a camera, a lighting apparatus with a light source for illuminating at least the recorded region and an evaluating unit for evaluating the image, wherein an image is understood to include both one or more individual image(s) and a sequence of images, i.e. a film. It is essential for machine vision applications that the illumination of the recorded region be as homogeneous and constant as possible during the recording of the image in order to ensure automated image processing.

An important parameter in the field of illumination for machine vision applications is therefore that the radiant power emitted by the lighting apparatus is as constant as possible because this, in turn, is responsible for keeping the irradiance (radiant power per surface unit at a particular working distance) as constant as possible. These parameters can then exert an influence on the control of the camera, e.g. the shutter speed, contrast, aperture settings, etc. of the machine vision system.

Unfortunately, LEDs are subject to significant fluctuations in emitted radiant power. These fluctuations can be brought about, for example, by aging or by fluctuations in the ambient temperature, and they affect the entire emitted wavelength range of the LED, especially the red range (in a wavelength range of ca. 600-670 nm), which is important for many machine vision applications. However, other light sources can also suffer from similar problems.

In practice, this problem leads to the fact, for instance, that lighting apparatus (e.g. LEDs) in machine vision applications are often switched on for a longer period of time before an evaluation is started so as to minimize a fluctuation in radiant power that occurs in the first 15-30 minutes as a result of the increase in self-heating. This fluctuation in the radiant power cannot be entirely eliminated, though, since the emitted radiant power depends upon many other factors, such as the heating of the lighting apparatus or light source or the ambient temperature, the hours of operation, etc.

Additionally, dirt on the lighting apparatus or an optical covering can result in a greater required output of the radiant power in order to achieve the same level of illumination, which is addressed in several documents.

To detect the degree of contamination on a window, for example, it is known from DE 1 755 074 B1 that the window can be irradiated with a beam of light in order to achieve a total reflectance on the soilable boundary surface of the window in case no contamination occurs. The totally reflected light within the window is optically coupled out of the window and evaluated. An attenuation of the totally reflected light is thus used as a measure for a degree of contamination on the window. However, the arrangement shown in DE 1 755 074 B1 is entirely unsuitable for machine vision applications, since this application depends upon as much light as possible being emitted by the lighting apparatus, and a total reflectance in an optical covering of the lighting apparatus would thus be completely counterproductive.

Document DE 28 33 635 C2 shows a similar arrangement using an LED as a lamp, wherein no total reflectance is utilized within a disk in this case, but instead a part of the light reflected back by the disk is evaluated. For this purpose, the LED is modulated at a low frequency and oriented to the optical boundary surface. Only a small part of the radiant power is transmitted, and the part that is reflected back is measured. The objective of DE 28 33 635 C2 is to detect long-term contamination of the optical boundary surface and, if a threshold value is exceeded, to trigger a cleaning of said boundary surface. Short-term fluctuations in radiant power caused by temperature fluctuations or aging are not taken into consideration.

Meanwhile, EP 122 609 B1 discloses a cloud height measuring device, in which the emitted light energy, which is attenuated by contamination on an output window, is kept constant. The light energy reflected back to the output window is detected as a measurement, and the transmission energy of the transmitter is regulated to compensate for the contamination. A measurement signal is emitted in the form of series of pulses and is reflected by the clouds and detected, wherein the degree of contamination is determined before or after the detection. The transmission energy is then adapted for the next measurement by modifying the duration of the series of pulses.

WO 2015/097476 A2 discloses an illumination system, wherein a memory unit saves the profile of characteristic parameters, such as the temperature of the light source and surroundings, control current, etc., and controls the light source as a function of the profile or the current value of these parameters.

SUMMARY OF THE EMBODIMENTS

The problem addressed by the present invention is that of indicating a lighting apparatus for a machine vision application which permits a precise adjustment of the irradiance emitted by the lighting apparatus in an illuminated area as a function of the working distance.

This problem is solved in that a transmitted component of a light which is emitted by a light source and which insides onto an optical covering in the lighting apparatus is transmitted through the optical covering, and a reflected component of the incident light is reflected in the optical covering. The intensity of the reflected component in the optical covering is detected by a light sensor. Furthermore, it is possible to implement an arrangement of the lighting apparatus and a control unit, wherein the control unit is connected to the light sensor and the light source, and it is configured such that, based on the intensity of the reflected component, the radiant power of the light source can be regulated by a control variable so that the transmitted component can be used to adjust the irradiance in an illuminated area. Of course, the control unit can also be an integral component of the lighting apparatus. The variable used for regulation can represent an electric current or an electric output, for example. Since it is the reflected component in the optical covering, and not the light reflected by the optical covering, that is detected, it is not necessary to install a light sensor on the light sensor side. This optical covering can also have additional optical tasks relating to the light transmitted through the optical covering, such as providing a diffuse transmitted light or optical filter functions. Moreover, the optical covering can aid in protecting the light source from contaminants or damage. Of course, it is also possible to use an optical covering that is already provided on the lighting apparatus and that fulfills these functions (protective function and/or optical tasks relating to the transmitted light) and additionally produces the claimed reflections and transmissions, as described above. The lighting apparatus can, of course, also comprise a plurality of light sources, wherein each light source can be controlled by its own control unit, or else multiple light sources or all of the light sources can be controlled by one control unit. Likewise, multiple lighting apparatuses can have a common control unit and/or a common optical covering.

The relationship between the emitted radiant power of the light source in the lighting apparatus and the control variable can be measured in advance, i.e. during the production of the lighting apparatus. In this way, a connection with the intensity measured by the light sensor can subsequently be established. A light sensor could also be placed with the light source and the radiant power emitted during operation could thereby be detected and supplied to the control unit. However, this would require additional expenses, and the light sensor would cover only a part of the illuminated surface and exert an influence on the emitted light, e.g. by forming shadows, which is to be avoided.

It is advantageous to measure the intensity of the reflected component at the edge of the optical covering. Among other things, this offers the advantage that the measurement occurs in a region that is less sensitive to contamination (and thus to an influence on the measurement). Moreover, the formation of shadows is prevented in this way, or the area that is to be illuminated is not deprived of light by sensors placed between the light source and the illumination area.

A plurality of light sensors, preferably four, can be provided at the edge of the optical covering, each of which detects the intensity of the reflected component at multiple, preferably four, locations on the edge. This can be helpful when the optical covering is rectangular in shape, but also at four locations on a round or oval optical covering. Measuring the intensity of the reflected component with multiple light sensors permits the transmitted radiant power to be detected as a function of the location on the optical covering, which is particularly advantageous. In this way, the transmitted radiant power at multiple locations on the optical covering can be calculated from different values of the intensity at different points on the edge of (or within) the optical covering by a suitable mathematical model. This then permits conclusions to be drawn about the locally dependent irradiance at defined working distances in the illumination area.

The light sensor or sensors measure the reflected component in the optical covering and can thus also be applied directly to the edge or edges of the optical covering. This represents a particularly simple configuration; alternatively, the reflected component could also be conveyed by an optical waveguide, for example, and could be evaluated by the light sensor or sensors. Doing so could reduce the further formation of shadows, for instance, wherein the sensors at the edge of the optical cover do not exert a significant influence on the arrangement. Of course, conveying the reflected component in this way is associated with additional expenses. It is also possible that the intensity of the reflected component emerging at the edge can be measured at a particular distance from the edge without optical waveguides.

The light sensor can be embodied as a spectral sensor that detects different spectral ranges of the reflected component in the optical covering. The spectral sensor can differentiate between wavelength and/or color, whereby the intensity of various spectral ranges can be measured separately.

The inner surface of the optical covering that faces the light source is advantageously configured to be reflectionless. This means that the light emitted by the light source and incident upon the optical covering penetrates entirely into the optical covering as the first transmitted component and is subsequently divided into the reflected component and the transmitted component on the outer surface facing away from the light source. If the inner surface of the optical covering is not reflectionless, then the extent of this first reflection on the inner surface must naturally be included in the calculation of the radiant power.

Configuring the optical covering such that total reflection occurs is most especially advantageous. This means that any incident light (which was not previously reflected on the inner surface of the optical covering and has not subsequently emerged through the outer surface of the optical covering as the transmitted component), i.e. all of the reflected component, remains in the optical covering in its entirety and that no further light is coupled out upon further impingement upon the optical boundary layers, i.e. the inner surface or outer surface of the optical covering. This total reflection can be achieved by appropriately manipulating the material, in particular the refractive index, of the optical covering, wherein the optical covering then functions like a waveguide. Of course, the optical covering must still be configured such that a part of the light is coupled into the optical covering through the inner surface in the form of a first transmitted component; a majority thereof is subsequently transmitted through the outer surface as the transmitted component, and a small part is reflected on the outer surface as the reflected component. Thus the ensuing reflection of this reflected component back and forth between the inner surface and outer surface, i.e. within the optical covering, occurs as total reflection. Only attenuation of the reflected component can occur, which can be ignored or included in the calculation of the radiant power, depending on the material.

Modifying the optical covering for total reflection results in significant expenses and also requires regions for the attachment of prisms, notches, etc. These regions then cannot be used for illumination, which in turn can lead to the formation of shadows.

If no total reflection occurs within the optical covering, then it should be noted that the reflected component is reduced with each reflection on the inner surface and outer surface of the optical covering, which must be taken into account in the control unit during the regulation of the radiant intensity. In this case, as well, an attenuation of the reflected component can be considered, if required.

Advantageously, a temperature sensor is placed in the vicinity of the light source, which serves to detect the ambient temperature of the light source. The temperature sensor is preferably located as close as possible to the light sources so that it is easier to back-calculate to the actual temperature of the light source. Multiple temperature sensors can also be installed (e.g. on each side). In any case, casting shadows or reducing the level of illumination on the luminous surface should be avoided. Providing a further sensor to measure the ambient temperature of the entire arrangement is likewise an option.

The lighting apparatus with the temperature sensor can be arranged with a modeling unit, wherein the ambient temperature of the light source is converted in the modeling unit to the temperature of the light source by a prescribed temperature model. Of course, the modeling unit can be an integral component of the lighting apparatus and/or of the control unit.

The temperature model serves the function of back-calculating to the actual temperature of the light source and is adapted to the type of light source and the design of the machine vision device. Ideally, all factors that influence the temperature of the system (thermal resistance, lossy circuit arrangements, etc.) are included in the temperature model.

The calculated temperature of the light source can be further incorporated into the calculation of radiant power, in particular by a pulse-pause ratio of a control variable. The modeling unit thus uses the measured ambient temperature to calculate the modification of the control variable that is necessary to compensate for the influence of the temperature.

The contamination of the entire machine vision system is a factor that should not be underestimated. It is not only the reduced irradiance of the illuminated area caused by contamination that should be considered here, but also especially the contamination of the camera lens. Excessive contamination can render the machine vision application unusable. Suitable countermeasures, such as increasing the intensity of the lighting apparatus, can counteract the contamination to a certain extent. If the degree of contamination increases too much, however, this fact must be reported so that suitable countermeasures, such as manual cleaning of the system or optical covering, can be carried out. In this case, the machine vision application must be interrupted until the problem is redressed.

Based on measurements of the intensity of the reflected component and the ambient temperature, it is possible to determine e.g. the degree of contamination of the optical covering: If the measured intensity lies outside a prescribed envelope, which can be determined e.g. from the aging, current control variable or current operating voltage and temperature behavior, then contamination of the optical covering can be assumed. The control variable can be regulated simply using a pulse-pause ratio of the control variable, for example.

The claimed lighting apparatus can thus be used to illuminate an illuminated area in a machine vision application.

A use of the described method in which the irradiance in the illuminated area is kept constant is especially advantageous.

Illuminations, particularly with LEDs, are often used in flash mode in the field of machine vision, since continuous illumination is not needed for many applications. The reasons can be as follows. An LED is capable of momentarily coping with up to five times the nominal current. This makes it possible to emit significantly greater radiant power for a short time. Additionally, the flash mode increases service life and lowers the temperature within the device compared to continuous operation. Even if ambient light is always a source of disturbance in the field of machine vision applications and its influence should be reduced or fully eliminated by suitable measures whenever possible, doing so can influence the measurement of radiant power. For instance, the time before the light source is activated in flash mode can be used to measure reflections of the ambient light. In this way, the effects of the ambient light on the measuring accuracy can be significantly reduced.

A computational model (e.g. by an envelope) that includes the properties of the light source, such as with respect to the temperature, service life/operating hours and type of operation (e.g. pulsed operation), can be used draw conclusions about the degree of contamination on the covering. Furthermore, the control variable can be readjusted or, if a readjustment is no longer possible, an alarm can be emitted to indicate the contamination as well as the compromised or no longer functioning lighting apparatus or machine vision system.

BRIEF DESCRIPTION OF THE DRAWINGS

The present invention is explained below in greater detail on the basis of FIGS. 1 through 5, which portray advantageous embodiments of the invention in an exemplary, schematic and non-limiting way. The following is shown.

DETAILED DESCRIPTION OF THE EMBODIMENTS

Figure 1:
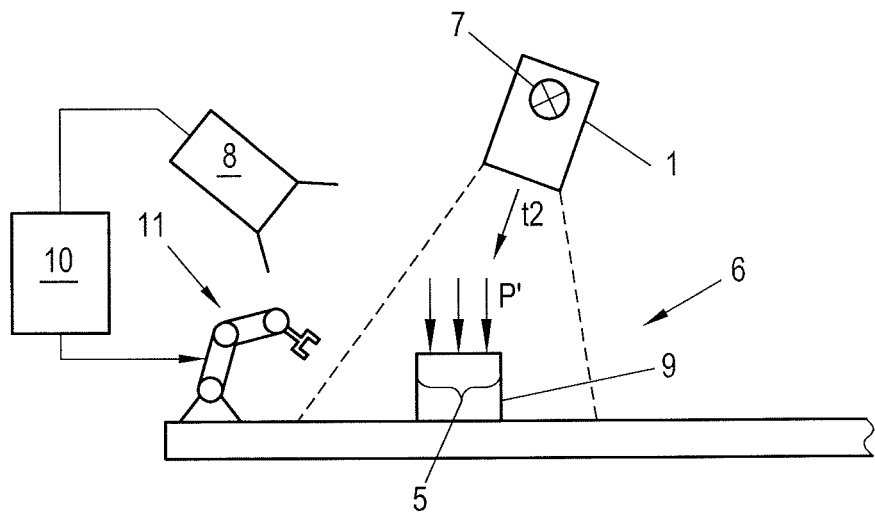
FIG. 1 shows an arrangement of a machine vision application.

A typical arrangement of a machine vision application is represented in FIG. 1. A lighting apparatus 1 with a light source 7 illuminates an illuminated area 5 in a work station 6, e.g. a machining or processing system. The illuminated area 5 of the lighting apparatus 1 contains a component 9, which is illuminated by the lighting apparatus 1 with light that has irradiance P' and that is recorded by a camera 8, which covers the illuminated area 5 (or a part of it). The image recorded by the camera 8 is evaluated by an evaluating unit 10, and the information obtained therefrom is utilized to control or regulate the work station 6 and/or a processing unit 11 in the work station 6. Of course, the lighting apparatus 1 can also be an integral component of the (smart) camera 8 and/or the evaluating unit 10. Since the design of a machine vision application is sufficiently well-known, the details of machine vision applications and systems will not be discussed here. The claimed method can aid in the constant illumination of the illuminated area 5.

Figure 2:
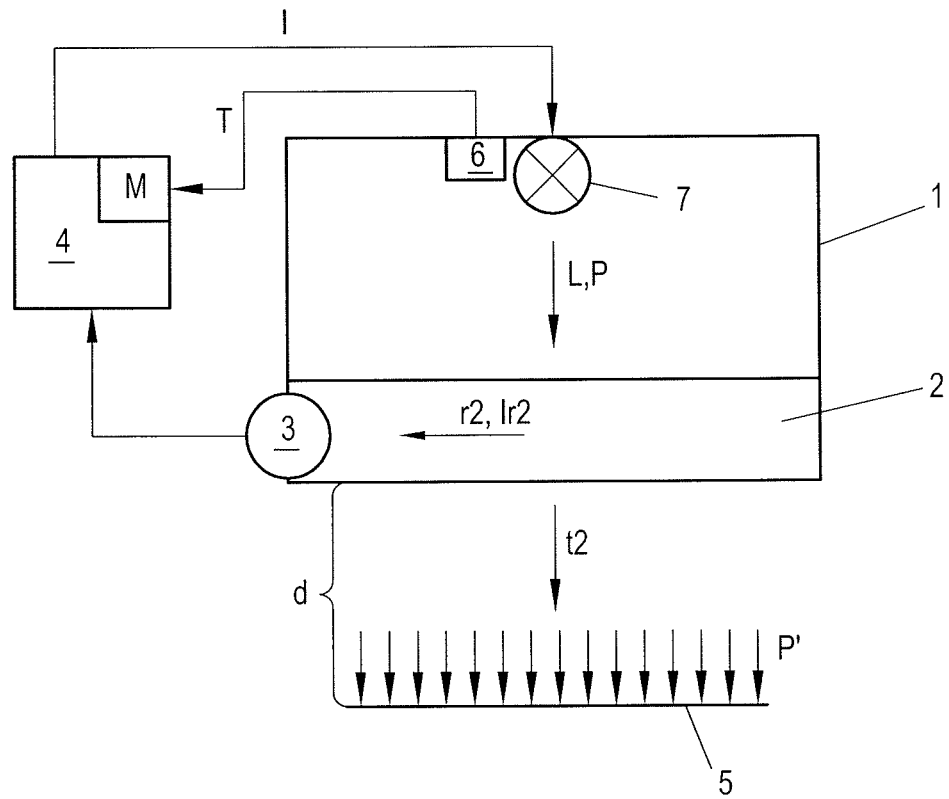
FIG. 2 shows the claimed device.

The claimed lighting apparatus 1 is described in more detail in FIG. 2. To protect the light source 7, the lighting apparatus 1 is covered with a transparent, preferably flat, optical covering 2, e.g. consisting of a suitable glass or plastic. The optical covering 2 thus serves, for example, to protect the light source 7 from dirt or mechanical damage, but, because of the light transmitted through the optical covering 2, it can also perform optical tasks, such as implementing an optical filter or generating a diffuse transmitted light. The largest portion of the light L that is generated by the light source 7 with radiant power P emerges through the covering 2 as transmitted component t2 and has an irradiance P' at a prescribed or known working distance d in an illuminated area 5. However, a portion of the light L emitted by the light source 7 is reflected in the covering 2 between the optical boundary surfaces of the covering 2. The intensity Ir2 of the reflected component r2 that is reflected in the optical covering 2 is detected by a light sensor 3. The intensity Ir2 is further supplied to the control unit 4, which then regulates the radiant power P of the light source 7 via a control variable I. The control variable I can represent an electric current or an electric output. The control unit 4, which can also be an integral component of the lighting apparatus 1 and/or the camera 8, utilizes the control variable I, preferably a pulse-pause ratio of the control variable I, to regulate the radiant power P of the light source 7 of the lighting apparatus 1, which is adjusted e.g. by a constant current source in order to set a desired, prescribed irradiance P' at a defined working distance d. The control unit 4 as well as the memory units and processors it requires can be located separately from the lighting apparatus 4 so that they do not require any space within the lighting apparatus 4, or they can also be integrated into the lighting apparatus 1.

Based on a known relationship between the radiant power P emitted by the light source 7 and the reflected component r2 or measured intensity Ir2 of the reflected component r2 (with a predetermined optical covering 2, predetermined light source 7 and geometry of the arrangement), it is possible to determine from the transmitted component t2 what the irradiance P' in the illuminated area 5 currently is. Regulating the light source 7 can then aid in adjusting the irradiance P' or keeping it constant at a working distance d, e.g. on the illuminated surface 5.

Figure 3:
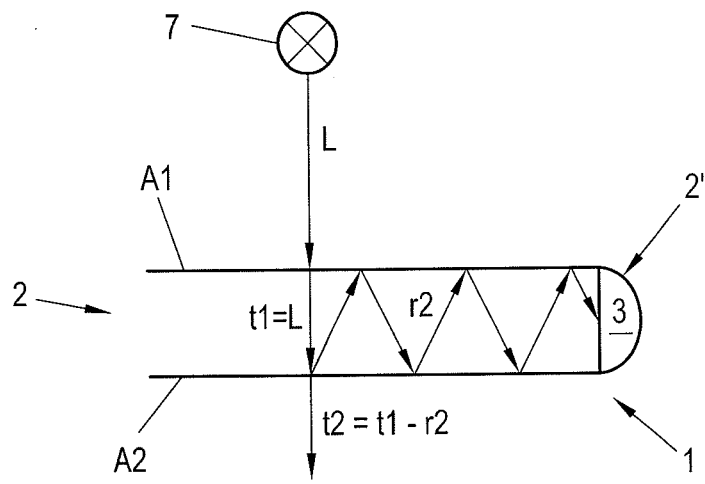
FIG. 3 shows an optical covering with a reflectionless inner surface and total reflection in the covering.

As FIG. 3 shows, the optical covering 2 has as its optical boundary surfaces an inner surface A1, which faces the light source 7, and an outer surface A2, which faces away from the light source 7 and thus faces toward the illuminated area 5. The light L emitted by the light source 7 insides onto the reflectionless inner surface A1 (on the side of the light source), is not reflected in this instance and, in FIG. 3, is conducted to the outer surface A2 as the first transmitted component t1, which corresponds to the incident light L. A reflected component r2 of the first transmitted component t1 (which corresponds here to the incident light L) is reflected on the outer surface A2 back to the inner surface A1. Since a total reflection of the reflected component r2 occurs in the optical covering 2 in FIG. 3, the reflected component r2 is reflected back and forth between the inner surface A1 and outer surface A2 without any further outcoupling and conducted to the edge 2' of the optical covering 2. The intensity Ir2 of the reflected component r2 is detected by the light sensor 3, e.g. at an edge 2' of the optical covering 2. Multiple light sensors 3 can also be provided, each of which detects the intensity Ir2 of the respective reflected component r2. In FIG. 3, the light sensor 3 is placed at the edge 2' of the optical covering. Placing the light sensor 3 on the sides of the optical covering 2, for example, permits an optimal incoupling of the reflected component r2 into the sensor 3. Moreover, the light sensor 3 can be configured as a spectral sensor. Different spectral ranges of the reflected component r2 can thus be detected; in other words, it is possible to differentiate between wavelength and/or color, whereby the intensity of various spectral ranges can be measured separately. The reflected components r2 of light sources 7 which emit light L in different spectra (IR, R, G, B, . . . ) can therefore be distinguished, for example, in the evaluating unit. It is thereby ensured that the necessary sensitivity of the light sensor 3 is established for illumination in different spectral ranges. Particularly in the IR range, simple light sensors 3 that cannot differentiate among spectral ranges have only very low sensitivity or cannot detect these spectra at all. In addition, the radiant power P of the differently colored types of light sources 7 (LED types) can be compared in this way. Irregular behavior of the different types of light sources (e.g. type-dependent, disproportionately declining radiant power P under the same operating conditions) can be detected, and various countermeasures (e.g. increasing the control variable I, longer pauses between pulses of the control variable I to lower the temperature of the lighting apparatus 1, etc.) can then be carried out in response.

Figure 4:
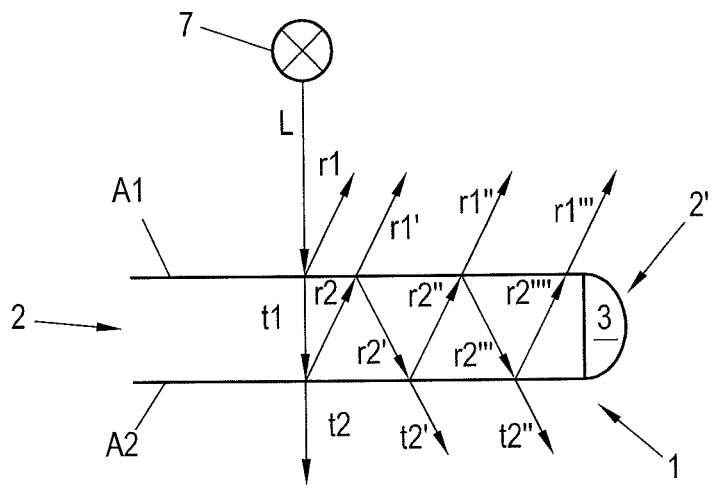
FIG. 4 shows an optical covering with a reflective inner surface and no total reflection in the covering.

FIG. 4 shows a more general case, in which no total reflection occurs in the optical covering 2, and the inner surface A1 on the side of the light source 7 is not reflectionless. A first reflected component r1 of the incident light L is thus reflected back to the lighting apparatus 1 on the inner surface A1 of the covering 2. This first reflected component r1 is influenced primarily by the angle of incidence of the light L, surface roughness of the inner surface A1 and the refractive index of the optical covering. If a first reflected component r1 is greater than zero, then the first transmitted component t1 of the light L that emerges through the inner surface A1 is less than the incident light L. If the incident light is not reflected on the inner surface A1, then the first transmitted component t1 corresponds to the incident light L, as is represented in FIG. 3.

The first transmitted component t1, in turn, insides onto the outer surface A2, wherein part of it is transmitted as transmitted component t2 and part of it is reflected back to the inner surface as reflected component r2. The transmitted component t2 subsequently aids in illuminating the illuminated area 5 and accordingly should be sufficiently powerful. The reflected component r2 continues to be reflected between the inner surface A1 and outer surface A2. If total reflection occurs, as in FIG. 3, then the reflected component r2 remains constant, apart from attenuation losses, and is conducted to the edge 2' of the optical covering 2, where it exits and where the intensity is detected by a light sensor 3. If there is no total reflection within the optical covering 2, as is represented in FIG. 4, then with every reflection a part of the reflected component r2 is coupled out of the optical covering, which functions as a waveguide, and a further reflected component r2', r2", r2'" that has been weakened is detected by the light sensor 3. Of course, this weakening must subsequently be taken into account during the calculation of radiant power P and the control variable I required for it. The aforementioned outcoupling also produces a further reflected component r1', r1", r1'", which, like any emerging reflected component r1, is conducted to the light source 7. Moreover, a further transmitted component t2', t2" is brought about, which must be added to the transmitted component t2. Therefore, as long as total reflection does not occur, it is apparent that the calculation of radiant power P and the control variable I requires further reflection and transmission parameters to be provided, although said parameters can be assumed to be known or can be detected by measurement.

The reflected component r2, the transmitted component t2, the further reflected components r2', r2", r2'" and the further first reflected components r1', r1", r1'" as well as the further transmitted components t2', t2" are thus dependent upon the type and characteristics of the covering 2 used, in particular the refractive index and the angles of incidence and reflection. Furthermore, the type of light source 7 (e.g. LED, . . . ) in the lighting apparatus 1 is critical, as is the radiant power P emitted by the light source 7. These parameters can be determined (empirically) in advance for any desired combinations of coverings 2 and light sources 7 and can be considered to be known.

Owing to external influences, especially temperature fluctuations, it is possible that fluctuations in radiant power P will still occur, which can be offset by detecting the ambient temperature T of the light source 7 by a temperature sensor 6, as is indicated in FIG. 2. In addition, a prescribed temperature model is utilized by a modeling unit M, which in this instance is integrated into the control unit 4, and it calculates the actual temperature of the lighting apparatus 1 and corrects the radiant power P in accordance with the temperature. Moreover, a conclusion can be drawn about the contamination of the optical covering 2 based on the temperature and current radiant power P of the light source 7 and the intensity Ir2 of the reflected component r2 in the optical covering (2). The modeling unit M and/or the control unit 4 can be an integral component of the lighting apparatus 1, as shown in FIG. 2, but they can also be located separately.

Figure 5:
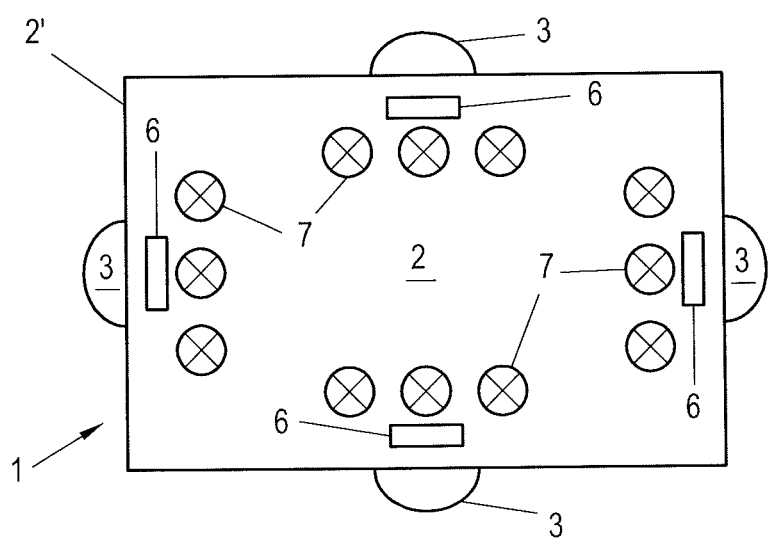
FIG. 5 shows a top view of a lighting apparatus with four light sensors, four temperature sensors and a plurality of light sources.

FIG. 5 shows a top view of a lighting apparatus 1 with four light sensors 3, all of which are positioned in different sections of the edge 2' of the optical covering 2. The lighting apparatus 1 comprises a plurality of light sources 7, which share the optical covering 2. The temperature sensors 6 in this instance are advantageously positioned behind the light sources 7, i.e. on the side of the lighting apparatus 1 facing away from the covering 2, in order to minimize the formation of shadows, but they nevertheless permit a precise measurement of the temperature.

The invention claimed is:

1. A lighting apparatus for illumination in a machine vision application, comprising:
    at least one light source that emits light with a radiant power;
    an optical covering configured such that a transmitted component of incident light passes through the optical covering and a reflected component of incident light is reflected in the optical covering, and
    a light sensor that detects the intensity of the reflected component in the optical covering.

2. The lighting apparatus according to claim 1, wherein the light sensor detects the intensity of the reflected component at an edge of the optical covering.

3. The lighting apparatus according to claim 2, wherein a plurality of light sensors are provided, which detect the intensity of the reflected component at a plurality of locations on the edge.

4. The lighting apparatus according to claim 3, wherein the plurality of light sensors comprises four light sensors, which detect the intensity of the reflected component at four locations on the edge.

5. The lighting apparatus according to claim 2, wherein the light sensor/light sensors is/are located at the edge of the optical covering.

6. The lighting apparatus according to claim 1, wherein an inner surface of the optical covering that faces the light source is non-reflective.

7. The lighting apparatus according to claim 1, wherein total reflection occurs in the optical covering.

8. The lighting apparatus according to claim 1, wherein the light sensor is configured as a spectral sensor that detects the various spectral ranges of the reflected component in the optical covering.

9. The lighting apparatus according to claim 1, wherein a temperature sensor is installed in the vicinity of the light source, which serves to detect an ambient temperature of the light source.

10. An arrangement with a lighting apparatus according to claim 1 and with a control unit, wherein the control unit is connected to the light sensor and the light source and is configured to regulate the radiant power of the light source by a control variable based on the intensity of the reflected component in order to use the transmitted component to adjust an irradiance in an illuminated area.

11. The arrangement according to claim 10, wherein the control unit is integrated into the lighting apparatus.

12. An arrangement with a lighting apparatus according to claim 1, comprising:
    a temperature sensor; and
    a modeling unit,
    wherein the temperature sensor is located in a vicinity of the light source and serves to detect an ambient temperature of the light source and is connected with the modeling unit,
    wherein the modeling unit converts the ambient temperature into an actual temperature of the light source using a prescribed temperature model.

13. The arrangement according to claim 12, wherein the modeling unit is integrated into the lighting apparatus.

14. A method comprising:
    arranging the lighting apparatus according to claim 1 for a constant illumination of an illuminated area in a machine vision application.

15. A method for illumination in a machine vision application, wherein light with radiant power is emitted by a light source, comprising:
    transmitting a transmitted component of the light through an optical covering and
    reflecting a reflected component of the light in the optical covering, and in that
    detecting an intensity of the reflected component, and
    regulating the radiant power of the light source on a basis of said intensity so that the transmitted component can be used to adjust an irradiance in the illuminated area.

16. The method according to claim 15, wherein the intensity of the reflected component is detected in a plurality of locations in the optical covering.

17. The method according to claim 16, wherein plurality of locations comprises four locations so the intensity of the reflected component is detected in four locations in the optical covering.

18. The method according to claim 15, wherein the irradiance at a working distance is kept constant.

19. The method according to claim 15, wherein the ambient temperature of the light source is detected and is drawn upon by a prescribed temperature model to regulate the radiant power.

20. The method according to claim 19, wherein a conclusion is drawn about the degree of contamination on the optical covering based on the intensity, the radiant power and the ambient temperature.

21. The method according to claim 15, wherein an alarm is emitted if a maximum intensity of the reflected component is exceeded.

* * * * *